(12) United States Patent
Seawell

(10) Patent No.: US 11,439,060 B2
(45) Date of Patent: Sep. 13, 2022

(54) ARBOR ADAPTER FOR CONVERTING ANGLE GRINDER TO COMPACT LINE TRIMMER

(71) Applicant: Scott Albert Seawell, Amboy, WA (US)

(72) Inventor: Scott Albert Seawell, Battle Ground, WA (US)

(73) Assignee: Scott Albert Seawell, Battle Ground, WA (US)

( * ) Notice: Subject to any disclaimer, the term of this patent is extended or adjusted under 35 U.S.C. 154(b) by 102 days.

(21) Appl. No.: 16/602,681

(22) Filed: Nov. 18, 2019

(65) Prior Publication Data

US 2021/0144913 A1 May 20, 2021

(51) Int. Cl.
*A01D 34/00* (2006.01)
*A01D 34/416* (2006.01)
*B24B 23/02* (2006.01)

(52) U.S. Cl.
CPC ........ *A01D 34/4166* (2013.01); *B24B 23/028* (2013.01)

(58) Field of Classification Search
CPC .............. A01D 34/4166; A01D 34/416; B24B 23/028; Y10T 29/49822
See application file for complete search history.

(56) References Cited

U.S. PATENT DOCUMENTS

| | | | | |
|---|---|---|---|---|
| 4,062,115 A * | 12/1977 | Lee | ...... | A01D 34/416 30/276 |
| 4,202,094 A * | 5/1980 | Kalmar | ...... | A01D 34/416 30/276 |
| 7,257,898 B2 * | 8/2007 | Iacona | ...... | A01D 34/416 30/276 |
| 7,882,774 B1 * | 2/2011 | Bernardy | ...... | B26B 25/00 83/835 |
| 10,369,681 B2 * | 8/2019 | Brantschen | ...... | B24D 5/12 |
| 2008/0171498 A1 * | 7/2008 | Woods | ...... | B24B 23/00 451/342 |
| 2018/0264622 A1 * | 9/2018 | Arthur | ...... | B27G 19/04 |
| 2020/0139514 A1 * | 5/2020 | Clifford | ...... | B24D 13/20 |

* cited by examiner

*Primary Examiner* — Steven O Douglas

(57) ABSTRACT

An arbor adapter for converting a common angle grinder to a compact line trimmer is disclosed. The trimmer, as converted, is powerful, efficient, and as safe as any of the typical uses for angle grinders. The prototype line trimmer is 13" in length and may be operated with one hand if desired. Conventional line trimmers are in the 66" range, or five times the length of the present invention. The invention requires no alteration of the factory angle grinder and guard. The invention could be modified as to material composition yet still meet the original scope and claims.

2 Claims, 7 Drawing Sheets

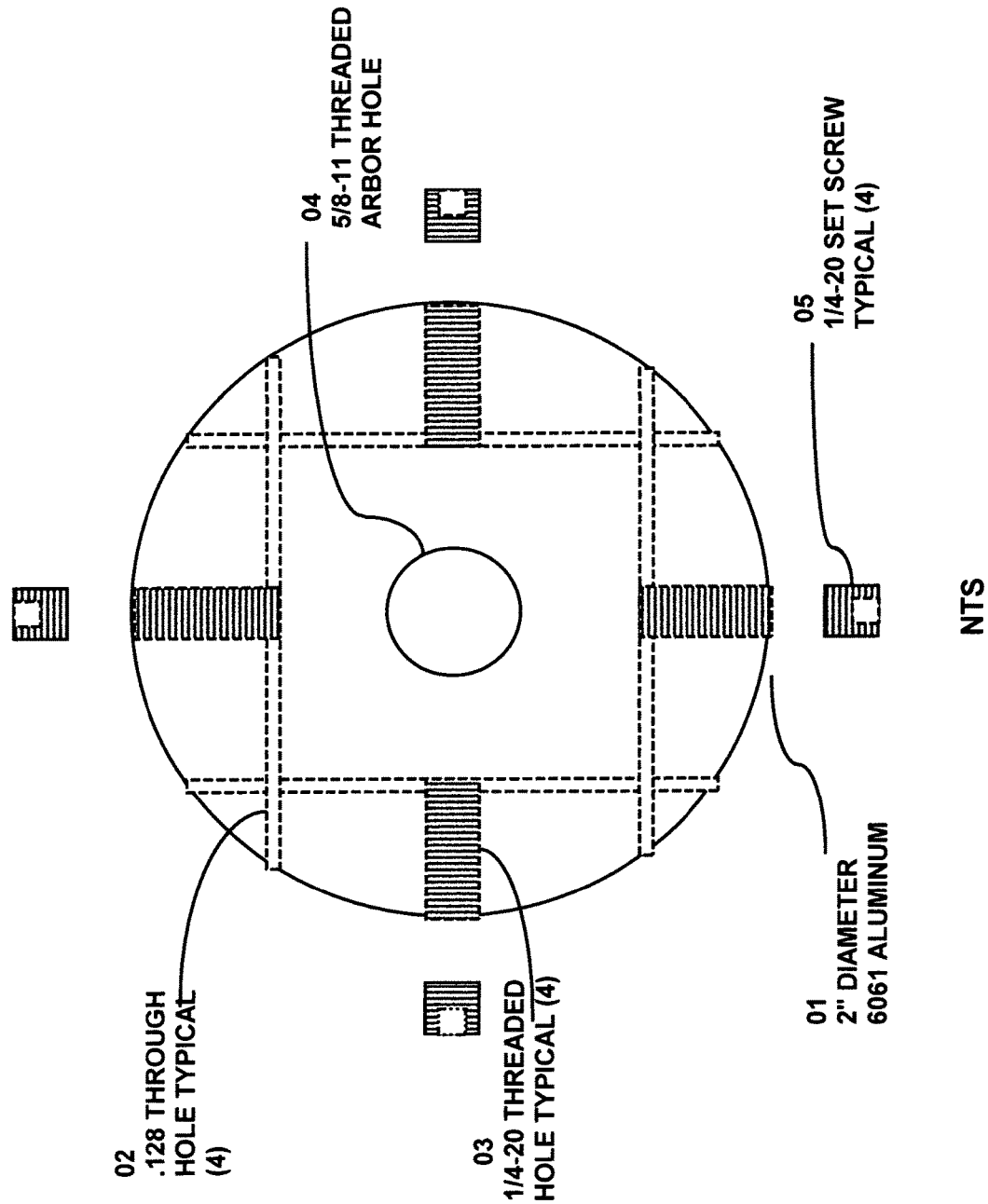

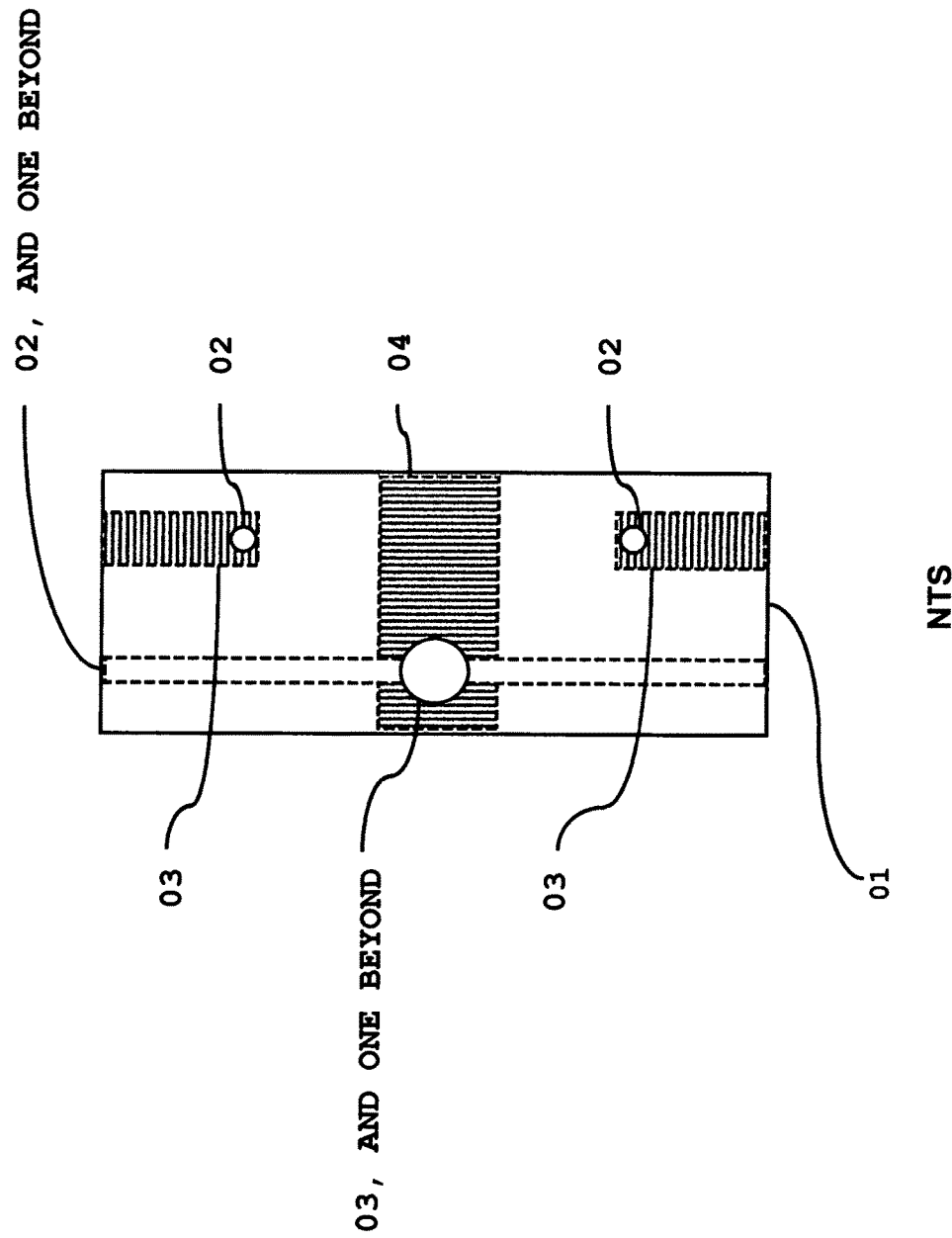

SECTION A-A

SECTION B-B

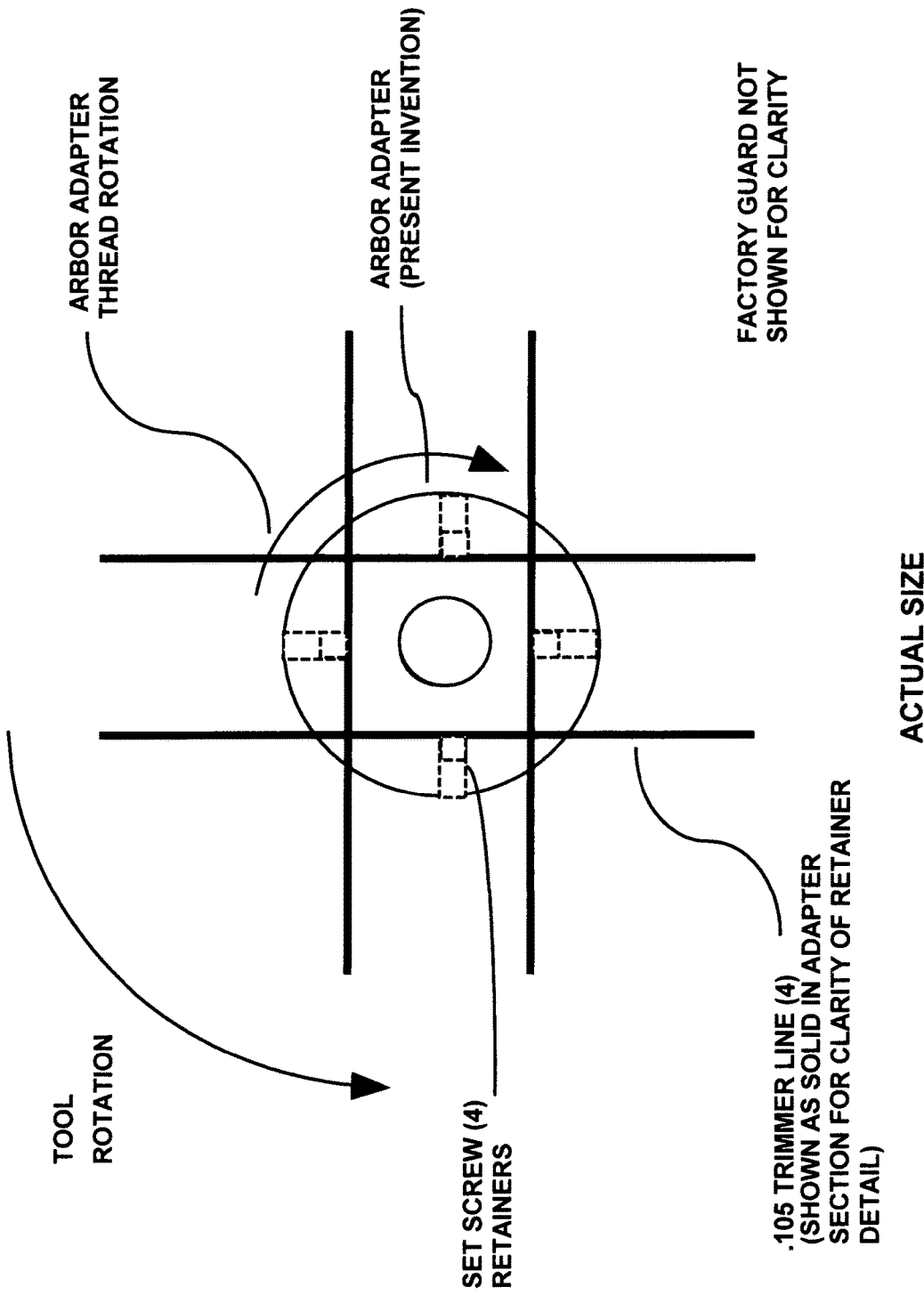

ARBOR ADAPTER FOR CONVERTING ANGLE GRINDER TO COMPACT LINE TRIMMER

RELATED USPTO APPLICATION DATA

This application claims benefit of Provisional Patent Application No. 62/917,260 filed Feb. 11, 2019.

TECHNICAL FIELD

The invention relates to trimmers used for grass and weed trimming, specifically line trimmers. Line trimmers are commonly available in gas, corded electric, and cordless battery powered configurations. They are used world wide by homeowners, landscapers, professional maintenance workers, gardeners, and arborists.

The invention also relates to electric angle grinders as the tool being adapted for use as a line trimmer. Angle grinders are commonly used in metal fabrication work, welding operations, auto body work, and many other commercial and industrial fields. The specific size and type of angle grinder relative to the invention is the most common, a 4½" cordless model with the industry-standard ⅝"-11 UNC arbor.

BACKGROUND

There have been many minor modifications to line trimmer designs over the years, yet they remain essentially the same in form and function; nylon line is attached to a motor driven rotating head, and the centrifugal force propels the line outward creating a flat plane, high RPM cutting action.

Though conventional line trimmers are efficient and easy to use, there is one drawback: they are quite cumbersome when being used in close proximity to obstacles like trees, structures, fences, flowerbeds, gardens, and outdoor furnishings.

The raised bed gardens that have become so popular in recent years have established a tremendous market for the present invention. Conventional trimmers are all but impossible to use in raised beds due to the elevation difference between the raised beds and surrounding ground, and they are simply too tall and bulky for use in raised beds. Given minimal spacing of 5 to 6 inches between rows of plants, the trimming performance of the compact present invention is impressive regardless of the height and density of the weedy material.

There is a clear and compelling need for a commercial grade, powerful, cordless and compact line trimming apparatus developed specifically for raised bed gardens and other close-proximity, detailed trimming operations. The present invention satisfies the need with a unique adaptation of a common power tool.

SUMMARY OF THE INVENTION

In accordance with the invention there is provided a novel arbor adapter allowing a common angle grinder to be converted to a compact, easily controllable, relatively lightweight, and safe tool for close-proximity trimming work.

Unlike conventional trimmers which typically have one trimmer line protruding through a central hub, the present invention incorporates four trimmer lines, two sets of two, each pair straddling the central arbor hole in mirror-opposite placement. With a conventional trimmer the single trimmer line protruding through the hub allows for two cutting lines, one each side of the hub. The present invention provides a total of eight cutting lines, four sets of two, distributed around the hub equally at 90 degree intervals.

The unique line pattern (two sets of two times two) was developed with three objectives in mind. First, the division of the cutting work between eight lines as opposed to the conventional two allows considerably longer cycles between line change-outs. Second, the arbor adapter is 2" in diameter and the safety guard is 5" in diameter; the resultant trimmer line length is about 1½", short by design. As such, they are long enough to cut efficiently yet short enough to be almost 100% tangle proof because they don't have the length to allow "whipping" of the line. Third, the invention as designed is perfectly balanced with machined holes in two mirror-opposite configurations. Balance is important for optimal life of the power tool, and it is also important for minimizing vibration, a leading cause of hand disorders.

Safety has been the first and foremost design consideration brought to the invention. The present invention and each integral component are all operating within the depth of the factory safety guard. The arbor adapter cannot become dislodged during use because the tool rotation is opposite the arbor adapter thread pattern. The set screws will be furnished with a light coat of medium-hold thread locking compound; in the event the consumer neglects to snug one or more of the screws against the trimmer lines, the screw won't back out.

It is important to note for both safety and liability reasons that the invention does not require any alteration or modification of the factory produced angle grinder and/or factory produced safety guard.

Line trimmers have been around for decades now, and most safety concerns have been addressed by manufacturers. The resultant disclaimers and waivers have become industry standard, i.e., wear hearing protection, gloves, and eye protection when using any line trimmer to protect the user and/or bystanders from noise, potential projectiles, and contact with the rotating trimmer lines. The safety concerns of the present invention will require the same obligatory warnings.

BRIEF DESCRIPTION OF DRAWINGS

FIG. 1 is a comprehensive front or back face (beyond) view of all machine work required through the depth of the arbor adapter. The actual layers are shown, in section, in FIGS. 3 and 4.

FIG. 2 is a side view of the 3 visible x-axis holes and a (beyond) view of the remaining holes.

FIG. 5 is a view of the assembly as seen from the top or bottom showing the actual size of the components in place.

DETAILED DESCRIPTION OF THE INVENTION

Figure 3A:
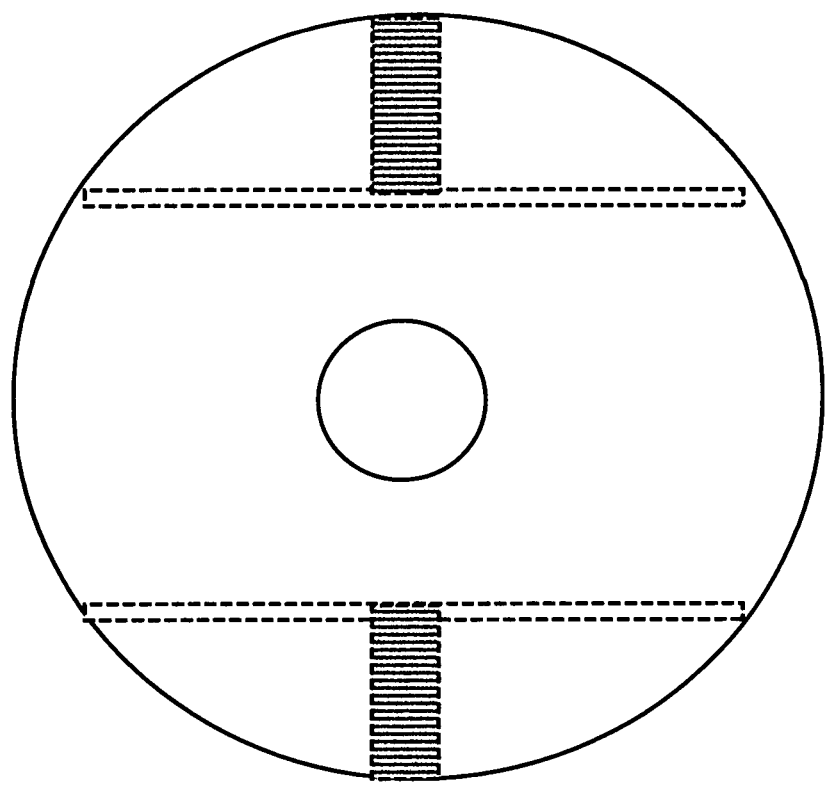
FIG. 3A is a face view of one half (A) of the arbor adapter.
Figure 3B:
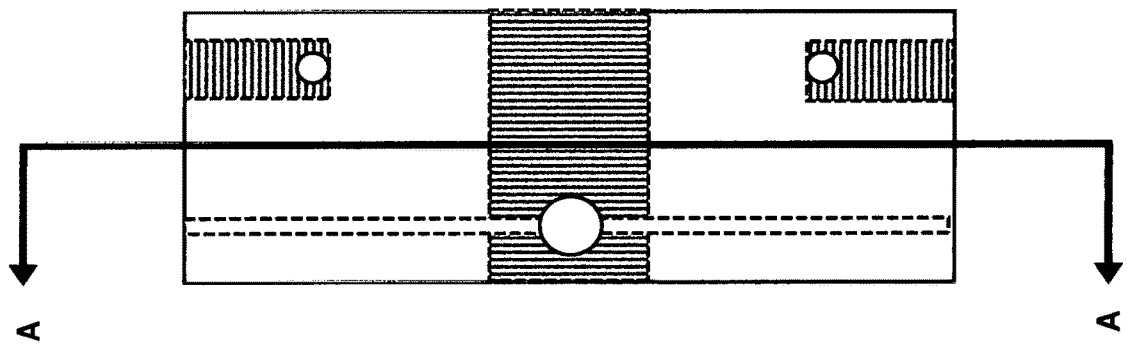
FIG. 3B is a section view of one half (A) of the arbor adapter.
Figure 4A:
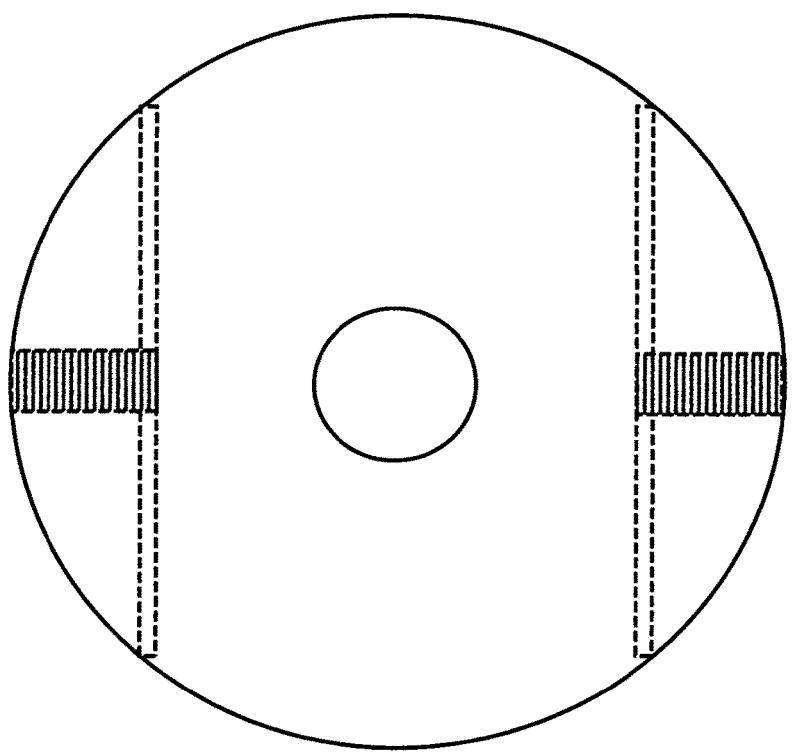
FIG. 4A is a face view of one half (B) of the arbor adapter.
Figure 4B:
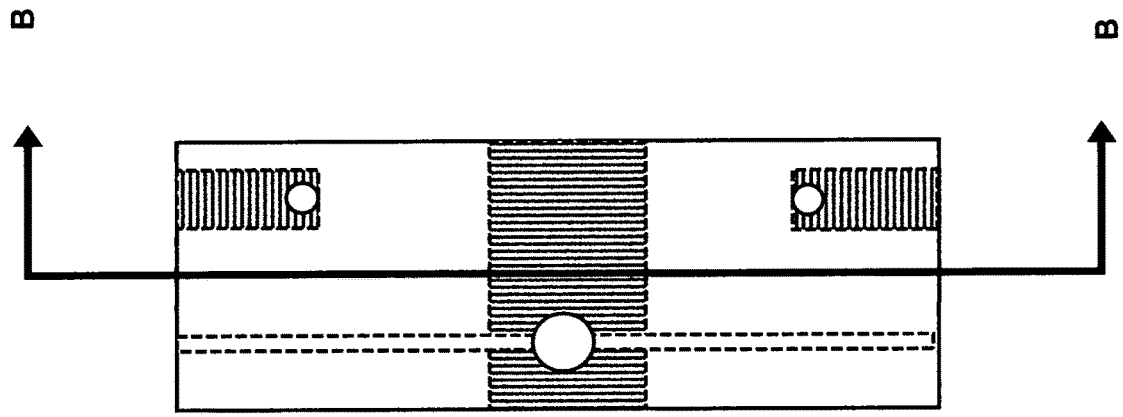
FIG. 4B is a section view of one half (B) of the arbor adapter.

The arbor adapter 01 is a puck shaped disc measuring 2" in diameter and ¾" thick. It is made of 2" diameter 6061 aluminum stock, a commonly available product, and this material was selected because the diameter is pre-established, the material is light but highly durable, it machines well, and it does not rust.

The (4) 0.128 diameter through holes 02 are for positioning the trimmer lines, and are sized to accommodate trimmer line diameters up to 0.125, or ⅛". They are arranged at 90 degree intervals for equal spacing and separated into two planes to allow the lines to cross each other in two directions. The present prototypes are fitted with a common 0.105 diameter round line which works very well.

The (4) ¼-20 threaded holes 03 are also arranged at 90 degree intervals in two separate planes to align with the respective through holes.

The ⅝-11 threaded arbor hole 04 is for attaching the arbor adapter to the requisite cordless angle grinder. The ⅝-11 right hand thread pattern has been industry standard for years among the leading grinder manufacturers. As referenced earlier, the right hand thread pattern and the left hand tool rotation ensure the arbor adapter can not spin off while in use. Only hand snugging is required and no tools or lock washers are necessary.

The (4) ¼-20 set screws 05 simply pinch the trimmer lines in place with minimal pressure (see FIG. 5). They will be pre-installed with a coating of medium-hold thread locking compound. Should a consumer forget to tighten a set screw the compound will prevent it from backing out. As depicted, the set screws are set fairly deep into the adapter which keeps them well protected and keeps the allen head wrench holes from being plugged with debris. The set screws only need to be turned one full turn or less to snug or release the trimmer line. The composition of the trimmer line is quite firm and holds the set screw in place nicely when compressed.

Marketing the invention will be left to marketing professionals, but the invention will likely be marketed as a kit, including the arbor adapter, the set screws (preinstalled), and an allen wrench for the set screws. The allen wrench should be long enough to serve double duty: it is provided for loosening or tightening the set screws, and it can also be used as a lever. Should the arbor adapter tighten up enough to be difficult to remove by a twist of the hand, the allen wrench can be inserted for the necessary leverage to loosen it. All hand held grinders have an arbor lock which keeps the arbor from spinning when loosening or tightening accessories.

Making the Invention

In the design phase of the invention, considerable thought was given to not only safety, consumer convenience, cost, and performance, but also efficiency of manufacturing. On a very basic level, the invention can be made utilizing some straight forward tooling, a high quality drill press, and a precision cutting method, whether bandsaw, chop saw, or water jet. The procedures involved are cutting the ¾" thickness, drilling three different sized holes (0.128, 3/16", and 9/16"), tapping two of the three sized holes (¼-20 and ⅝-11), and final deburring and cleaning. At the other end of the spectrum of manufacturing possibilities, the invention can be 3D printed with current technology using any number of materials or composite materials.

For the average person of ordinary skill in the art, CNC milling technology would be the most likely manufacturing scenario. The invention is well suited for automated manufacturing processes. For example, the holes drilled/machined from the outside edge are in two opposing planes, both equidistant from the centerline to adjacent face. The same holes are positioned at 90 degree intervals as well as at 90 degree angles to one another. Accordingly, the invention was purposely designed with CNC setup procedures, repeatability, and quality control in mind.

The invention can be manufactured by an individual with common skills and some basic machinery, or it can be mass-produced by a large corporation. The chosen method and scale will be driven by market potential and whoever is in the driver seat. Market potential indicators are in fact excellent.

Using the Invention

The best mode is for the invention to be used to trim grass and/or weeds in locations that a conventional line trimmer can not be used without risking injury to the consumer or damage to property. The invention can be used after mowing and conventional line trimming, to simply trim whatever is left, or as a dedicated raised bed garden trimmer. The invention can also be used by arborists, horticulturists, and farmers in a myriad of applications, including overhead and ladder work.

The invention is simple to use as follows: First, insert the four trimmer lines into the four smallest holes . . . this may require slight twisting of the line to get past the center point where the set screw retainers are located . . . position each line so each end projects an approximate equal amount. Second, with the included allen wrench, snug the preinstalled set screws against each of the four lines. Third, in a clockwise direction, spin the adapter onto the arbor shaft so it is hand tight. The invention is ready to use.

What is claimed:

1. An arbor adapter for converting an angle grinder to a compact line trimmer, comprising: a puck-like disc made of 2 inch 6061 aluminum round stock that is ¾ inch in thickness forming a body of the adapter, wherein the body of the adapter incorporates a ⅝ inch threaded hole centered in the disc adapted for attachment to and angle grinder arbor and wherein the body further comprises four 0.128 inch diameter holes for accommodating placement of nylon string trimmer line and four threaded ¼ inch holes for accommodating set screws to secure said nylon string trimmer line.

2. The arborer adapter of claim 1 wherein a unique nylon line arrangement is established having two cutting planes with eight individual trimmer lines.

\* \* \* \* \*